May 13, 1969
W. COSBY
3,444,368
CASSETTE HOLDER WITH MEANS FOR ATTACHMENT
IN THE BUCKY SLOT OF AN X-RAY TABLE
Filed Oct. 21, 1965
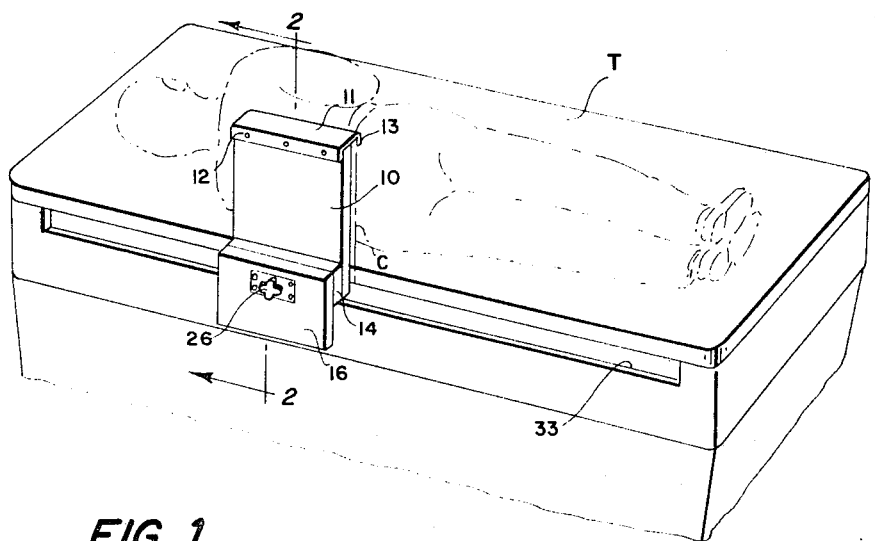
FIG. 1
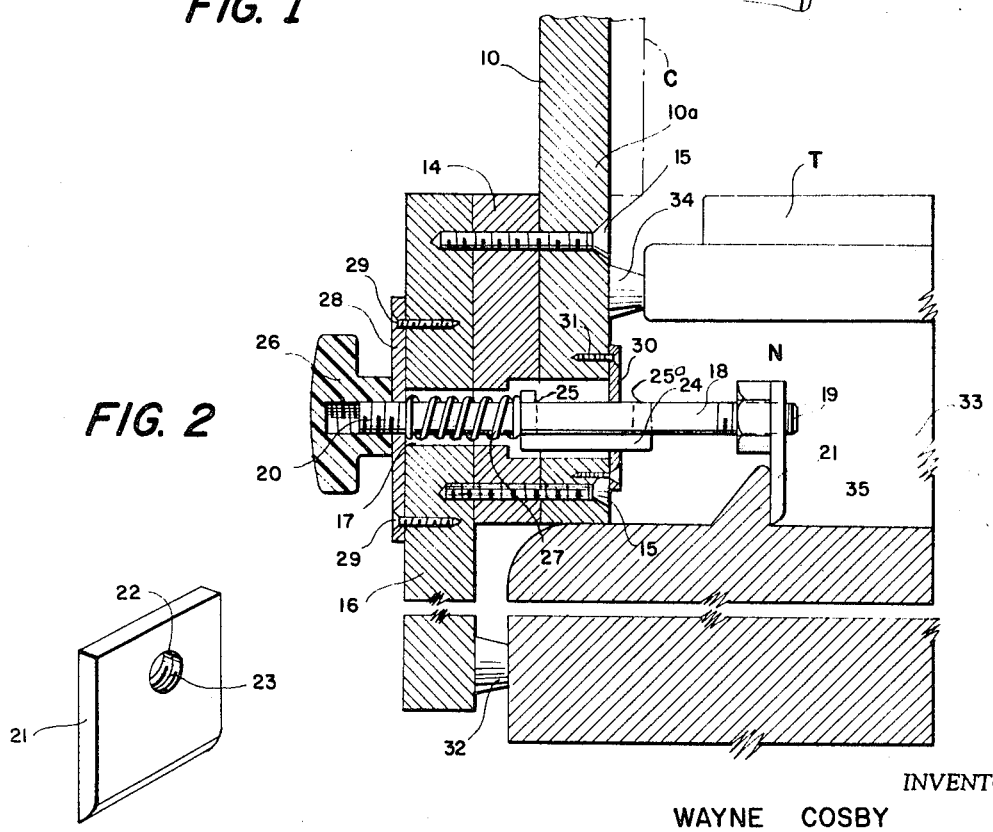
FIG. 2
FIG. 3
INVENTOR
WAYNE COSBY
BY *Vernon A. Dorsey*
ATTORNEY

United States Patent Office 3,444,368
Patented May 13, 1969

3,444,368
CASSETTE HOLDER WITH MEANS FOR ATTACHMENT IN THE BUCKY SLOT OF AN X-RAY TABLE
Wayne Cosby, Dallas, Tex., assignor of one-half to Fred H. Dunn, Dallas, Tex.
Filed Oct. 21, 1965, Ser. No. 499,718
Int. Cl. A61b 6/04
U.S. Cl. 250—58                                    3 Claims

ABSTRACT OF THE DISCLOSURE

The present invention is directed to means for mounting a cassette holder to the edge of an X-ray table so that the cassette holder is above the upper surface of the X-ray table and can be moved along the length of the X-ray table.

---

This invention relates to a cassette holder to be used in connection with an X-ray table for taking X-ray film exposures parallel with the top of the X-ray table.

Heretofore most X-ray film exposures have been taken from either above or below the X-ray table and it is sometimes necessary to take a film of the patient lying on the table and have an X-ray tube on one side of the table and an X-ray cassette on the other side to receive the X-ray exposure taken through the patient. The X-ray exposure in this case would be taken parallel to the top of the X-ray table.

With this X-ray cassette holder, it is possible to adjust the same along the entire length of the bucky slot.

This invention therefore is directed to a cassette holder which projects upwardly of the edge of the X-ray table and holds the cassette firmly in relation to the table. This invention accomplishes this by anchoring to the X-ray table through the bucky slot.

In the drawings:

FIG. 1 is a perspective view of an X-ray table with the cassette holder anchored in the bucky slot and the patient lying on the table between the X-ray tube and the cassette holder.

FIG. 2 is a section on line 2—2 of FIG. 1 showing the cassette holder in detail.

FIG. 3 is a perspective view of the threaded metal plate which engages the projection 35 on the bottom face of the bucky slot and forms the means for attaching the cassette holder to the X-ray table.

Referring to FIGS. 1 and 2, T is an X-ray table.

Now referring to FIG. 1 in detail, the upper large portion 10ᵃ of the cassette holder 10 has mounted thereon a cap 11 by screws 12 that penetrate the upper portion 10ᵃ of the cassette holder 10 and hold the cap 11. This cap 11 has a turned down shoulder 13 removed laterally from the upright portion of the holder 10 in which the upper edge of the cassette C is covered by said shoulder 13 to hold the cassette C in an upright position against the upright inner side of the cassette holder 10.

A filler block 14 is attached to the outer side of the bottom of the upright portion 10ᵃ of the cassette holder 10 by screws 15 which extend through the upright portion 10ᵃ of the cassette holder 10 through the filler block 14 and into a lower block 16. Therefore the cassette holder 10 at its bottom comprises the large upright 10ᵃ, the filler block 14 and the outside smaller block 16, all securely connected together, through which there is an opening 17 extending through the three members forming the cassette holder 10, through which is positioned a metal rod 18 threaded at both ends by threads 19 and 20.

Mounted on the metal rod 18 over the threads 19 is a fastener 21, the same being in the form of a metal plate with an opening 22 therein having threads 23 to engage the threads 19 of the metal rod 18 (see FIG. 3). The function of the metal fastener 21 will be described later.

N is an internally threaded nut which engages the thread 19 of the metal rod 18 and is used as a back-up for the fastener shown in the form of a metal plate 21.

A metal U-shaped guide 24 for the threaded metal rod 18 is mounted in the opening 17 between the first section 10ᵃ and second section 14 of the cassette holder 10, heretofore described. The ends of the U-shaped guide 24 have openings 25, 25a therethrough through which the rod 18 is movable.

Between the metal guide 24 and the operating handle 26 is interposed a coil spring 27.

The outer face of the lower portion 16 of the cassette holder 10 is covered by a face plate 28 adjacent the operating handle 26. The face plate 28 is attached to the lower section 16 of the cassette holder 10 by screws 29.

The lower inside portion of the larger upright portion 10ᵃ of the cassette holder 10 has likewise a face plate 30 connected to the lower portion of the cassette holder 10 by screws 31.

Interposed between the inside face of the smaller block 16 are buffers 32 to engage the portion of the table T below the bucky slot 33. Likewise, there are buffers 34 which engage the table T above the bucky slot 33, the same being attached to the lower inside face of the upper member 10ᵃ of the cassette holder 10.

By assembling the cassette holder 10 on the side of the table T and placing the metal fastener 21 over the projection 35 that runs parallel with the bottom of the bucky slot 33 and thereafter turning the operating knob 26 in a clockwise manner, the cassette holder 10 will be drawn towards the X-ray table T and held firmly thereto by the thread mechanism on the metal rod 18 in conjunction with the threaded metal fastener 21.

What is claimed is:

1. In a cassette holder for attachably mounting the same on the edge of an X-ray table above the top of the X-ray table, said table having a bucky slot with a projection formed therein, a metal rod having threads on both ends thereof penetrating through the lower end of said cassette holder, an operating knob threaded on one end of said metal rod, a metal plate having an opening with threads therein attached to the other end of the metal rod by threads, the metal plate being in contact with the projection in the bucky slot whereby the movement of the operating knob moves the metal plate on the threaded metal rod to secure the cassette holder on the X-ray table.

2. The structure according to claim 1 in which the cassette holder has a cover plate on its top to engage the cassette.

3. The structure according to claim 1 in which the lower portion of the cassette holder has an off-set member attached thereto, which member is in contact with that portion of the X-ray table which is below the bucky slot.

References Cited

UNITED STATES PATENTS 2,876,359   3/1959   Plymale _____ 250—58
3,051,832   8/1962   Pigg _____ 250—50

WILLIAM F. LINDQUIST, *Primary Examiner.*

U.S. Cl. X.R.
250—50